Aug. 10, 1965     J. G. FONTAINE     3,199,804
RETRACTING DEVICE FOR AUTOMOBILE SEAT BELTS
Filed May 17, 1963     3 Sheets-Sheet 1

INVENTOR.
JOHN GARFIELD FONTAINE
BY
ATTORNEY

Aug. 10, 1965  J. G. FONTAINE  3,199,804
RETRACTING DEVICE FOR AUTOMOBILE SEAT BELTS
Filed May 17, 1963  3 Sheets-Sheet 3

INVENTOR.
JOHN GARFIELD FONTAINE
BY ATTORNEY Emery A. Yeager

United States Patent Office 3,199,804
Patented Aug. 10, 1965

3,199,804
RETRACTING DEVICE FOR AUTOMOBILE
SEAT BELTS
John Garfield Fontaine, 2817 SE. 25th Court,
Fort Lauderdale, Fla.
Filed May 17, 1963, Ser. No. 281,281
2 Claims. (Cl. 242—67.1)

This invention relates to safety belts for automobiles and has a particular reference to means by which a safety belt of this character is retracted and positioned out of the way of an automobilist while he or she is entering or leaving the car, thereby avoiding the possibility of accident and resultant injury to the car user.

One of the obstacles prevalent in connection with seat belts of conventional construction and disposition is the fact that the belt when not in use usually rests on the floor of the car with the fastening elements or hardware of the belt exposed. The construction of the hardware or buckles in general use is such that it is likely to invite the possibility of the car user catching in it or tripping over it when entering or leaving the car. In such case the seatbelt user might trip and fall and cause possible injury to himself or herself, and particularly in the case of a female belt-user wearing high-heeled shoes.

Another disadvantage following from the use of conventional safety belts is the possibility that a part of the belt, when the belt is not being used, might become caught between the door and the frame of the automobile, thus acting to prevent closure of the door. This results in a possibly dangerous situation.

It is therefore an object of the present invention to provide a means by which a safety belt can be retracted when not in use and be thus disposed out of the way so that the possible contingencies heretofore mentioned will be eliminated.

It is another object of the invention to provide a safety belt retracting device by which safety belts for both the front and rear seats of a car can be retracted when not in use, but can be selectively pulled forward into operative position whenever required.

With these and other objects to be hereinafter set forth in view, I have devised the arrangement of parts to be described and more particularly pointed out in the claims appended thereto.

In the accompanying drawings, wherein an illustrative embodiment of the invention is disclosed, FIG. 1 is a top plan view of the apparatus for retracting safety belts, as constructed in accordance with the invention;

Figure 6:
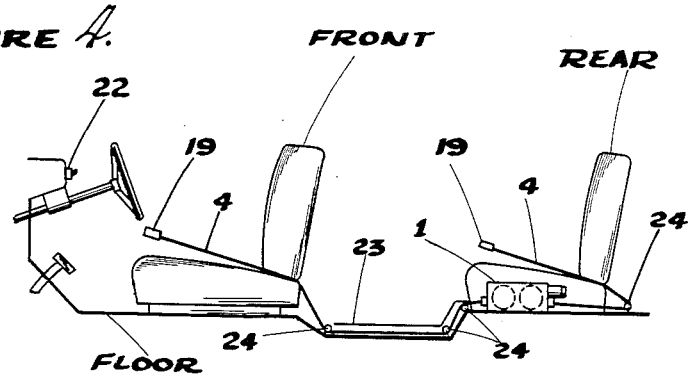
FIG. 6 is a diagrammatic view showing the application of the belt-retracting device to an automobile.

The seat belt retracting device includes an electric motor shown at 17 and operated by the current obtained from the battery of the car. The motor 17 is mounted upon the rear wall of a housing 1 by the bolts 17a and the housing as shown in FIG. 6, may be mounted under the rear seat of the car and secured down by means of the bolts 1c extending through ears or lugs 1b.

Figure 1:
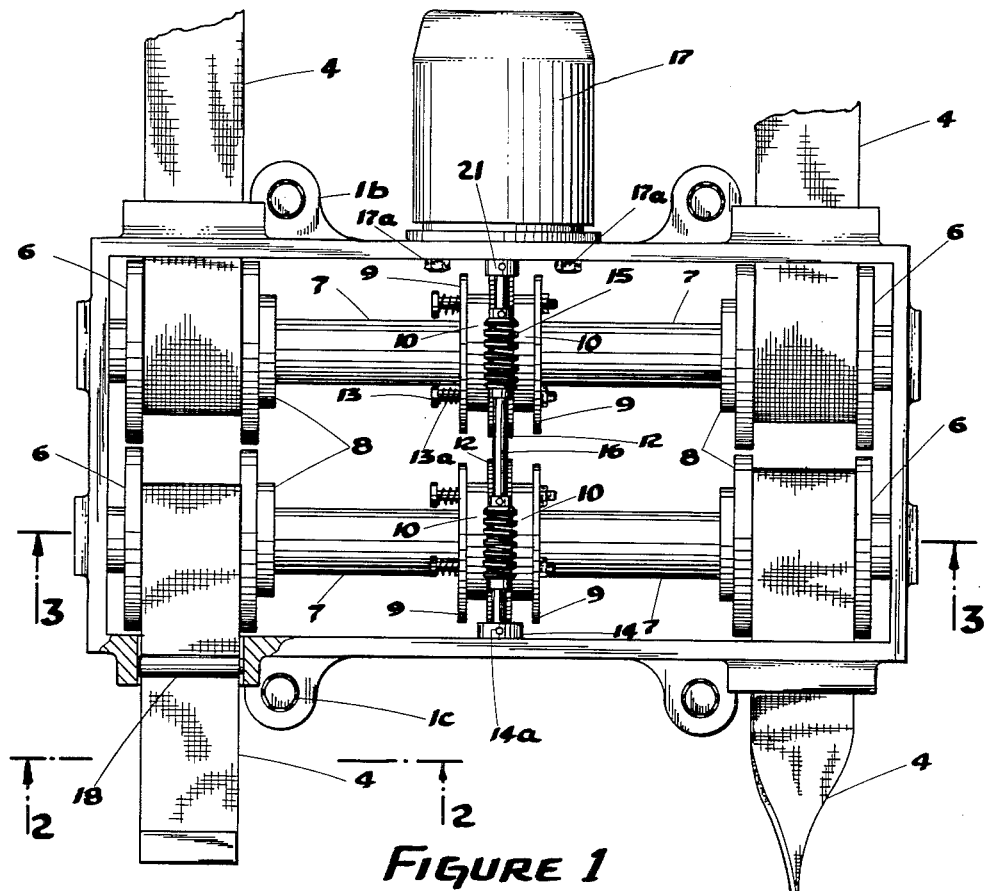
Figure 2:
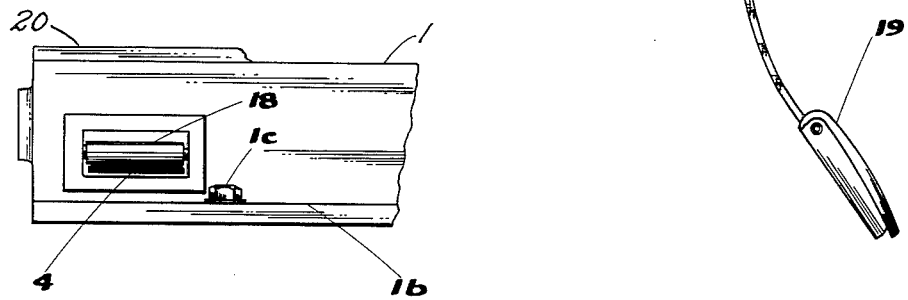
FIG. 2 is a view taken substantially on the line 2—2 of FIG. 1, looking in the direction of the arrows.

The rotation of the motor 17 is transmitted by means of a motor shaft 16 extending from one side of the housing to the other side and carrying two worms 15. Collars 21 and 14 maintained by the set screws 14a and 21a hold the shaft 16 against endwise movement. The shaft 16 is rotative in the bearings 16a. Each of the worms 15 engages with a worm gear 12, rotative on a fixed spindle 2 and each of the sections of the shafts 7 is engageable with the worm gear 12 and thus rotated. Each of the parts of the shafts 7 turns about the spindle 2, supported by bearings 3 and 11 and secured against axial movement by cotter pins 2a. The two shafts 7 are arranged in spaced, parallel positions on their respective spindles 2 as will be apparent from FIGURE 1. One of the shafts 7 carries the belts for the rear seat occupants and the other carries the belts for the occupants of the front seats.

The tubular shafts 7 carry the belt pulleys or reels generally indicated at 6 and which pulleys have flanges 8 pinned to the respective shafts 7 by means of set screws 8a. The flanges 8 have the part 7b of the shaft 7 located between them and which part forms the hub of each reel around which the belt is wound when it is retracted.

Mounted perpendicularly to the flanges 8 and an extending parallel to the shaft 7 and connecting the flanges 8 of each pulley, is a pin 5 around which the loop 4a of a seat belt is fitted. The pin 5 is secured to the flanges 8 by the threaded arrangement 5a, 5b and 5c shown at the left in FIGURE 3. Thus the pin rotates along with the shaft 7 and around the spindle 2. In order to fit the belt 4 around the pin 5, a hole 1a is provided in the housing through which the pin may be inserted to fit it through the loop 4a at the end of the belt and mount it between the flanges 8.

The rotative movement of the worm gears 12 driven from the motor through the worms 15, is transmitted to the halves of each of the shafts 7 by means of a two-piece friction clutch 10, the arrangement of which permits individual rotation of the parts of the shafts 7 and the connected belts. That is to say, the left belt can move or retract independently of the right belt.

Figure 3:
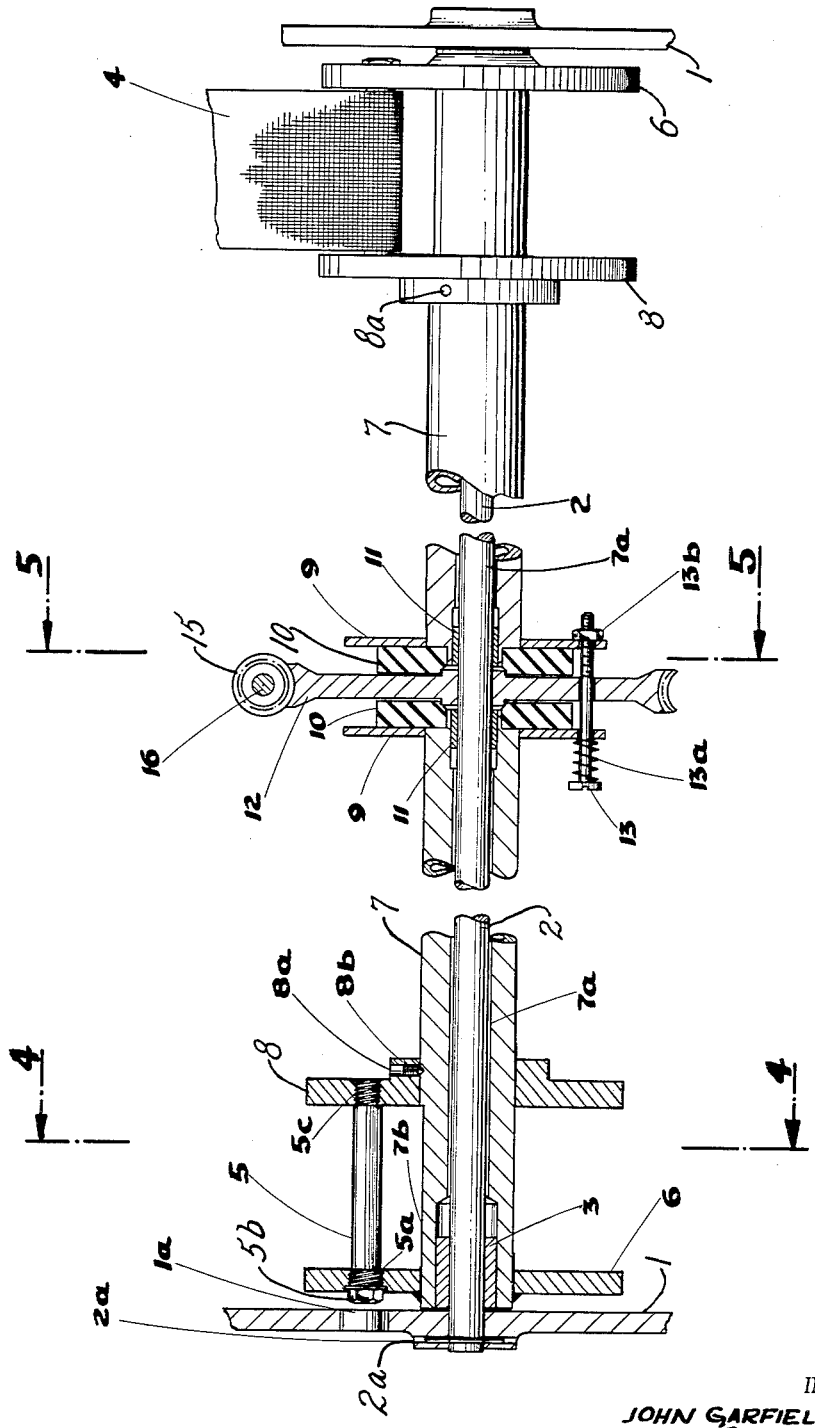
FIG. 3 is a sectional view, taken substantially on the line 3—3 of FIGURE 1, looking in the direction of the arrows.
Figure 5:
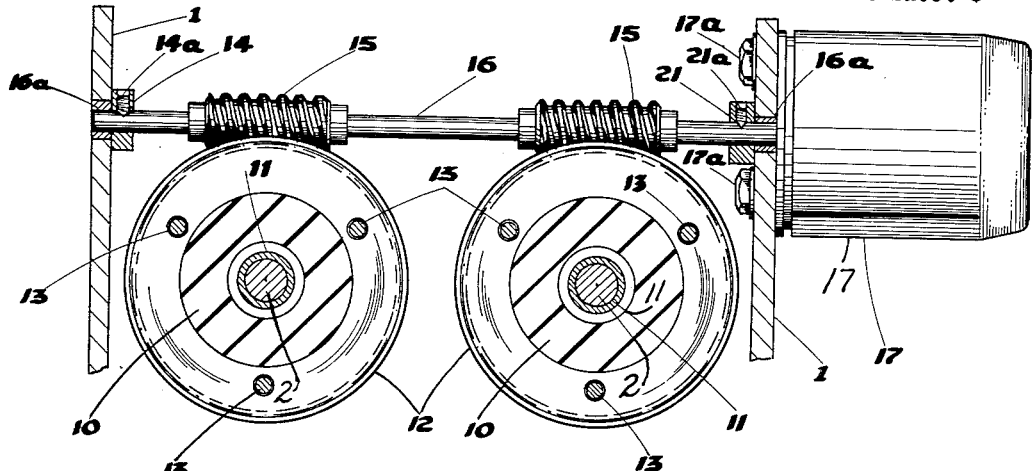
FIG. 5 is a sectional view, taken substantially on the line 5—5 of FIGURE 3, looking in the direction of the arrows.
Figure 4:
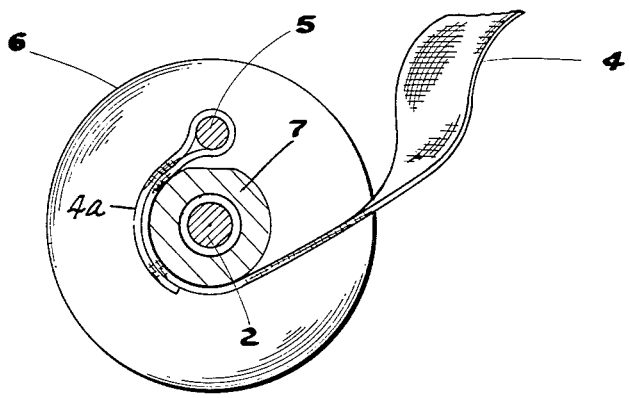
FIG. 4 is a sectional view, taken substantially on the line 4—4 of FIGURE 3, looking in the direction of the arrows.

The clutch consists of two friction disks 10 composed of plastic material and held in place on shaft 7 by two retaining rings 9 between which the two disks 10 are positioned as clearly shown in FIGURE 3. The friction disks 10 rotate around the spindle 2 along with the halves of the shaft 7 and are supported by the bearings 11. The rings 9 are connected to the worm gear 12 by the use of three spring-loaded bolts 13 located adjacent to the peripheral edge of the retaining rings 9. The bolts 13 pass through the worm gears 12 through enlarged holes or slots therein and the springs 13a on each of the bolts provides for a pressure on the sliding surfaces of the disks 10. The holes through the worm gear through which the bolts 13 pass are preferably enlarged or slotted in a manner to allow for a certain amount of play in the transmission of the rotating action.

As seen in FIGURE 6, the motor is adapted to be controlled by a push-button switch suitably located on the instrument panel of the car as shown at 22, and upon the imposition of manual pressure on the button, the motor 17 will be activated and the shaft or shafts 7 on which the belts 4 are mounted will be rotated to retract the belt or belts and cause them to be wound around the shafts 7 on the reel portion thereof between the flanges 8. Upon complete retraction of the belts the pressure on the push-button is released, thus ceasing the operation of the motor 17 and ending the retraction and winding up of the belts.

The belt-retracting apparatus is designed to accommodate either a single set of belts for the front seat only, or to accommodate a twin set of belts for the front and rear seat respectively. As heretofore stated, the belt-retracting unit is mounted under the rear seat of the automobile and the belts are guided to their respective operative positions over the guide rollers 18 and 24.

To place the belts into their positions of application and use, all that the autoist is required to do is to pull the several belts out of the unit and secure them around his torso. The belts should be pulled out as far as they will go, by sufficiently applied manual pulling force imposed upon them and sufficient to overcome the force imposed by the clutch springs 13a, and permit the disks 10 to rotate without causing the rotation of the rings 9 or the spindles 2.

When the belts are completely pulled out or extended and fastened around the user, they are similar to the standard floor-mounted seat belts. As the belt is secured around the user it forms an arrangement that in case of an accident or sudden stop the belt provides adequate restraining power.

The rigid fixed length of the belts has definite safety advantages over inertia-operated retractible units since the user can adjust the belt play about his body, thus assuring maximum restraining protection. When it is desired to remove the belt, the buckle fastening 19 is opened; the end of the belt section is freed from the buckle-bearing section and the push-button 22 is pressed and the belt section retracted and wound upon the flanged shafts 7, thus bringing the belts out of the way of a person entering or leaving the car and thus preventing accidents.

Having thus described a single embodiment of the invention, it is obvious that the same is not to be restricted thereto, but is broad enough to cover all structures coming within the scope of the annexed claims.

What I claim is:

1. A retracting device for automobile safety belts comprising, a fixed spindle having two co-axial tubular shafts rotatively mounted on it, each of said shafts carrying a belt-receiving reel, a motor, transmission means between the motor and shafts to rotate the shafts, said transmission means including a gear driven from the motor and rotatively mounted on the spindle between the ends of the shafts, each of the shafts carrying a friction disk between which the gear is located, a ring freely and slidably mounted on each of the shafts, with the friction disks and gear being disposed between said rings, means connecting the rings to the gear and spring means for urging the rings toward one another to cause them to frictionally engage the friction disks between them to cause the shafts to be rotated by the rotation of the gear from the motor.

2. A retracting device for safety belts according to claim 1, wherein the means which connects the rings to the gear consists of a plurality of pins extending between the rings and passing through apertures in the gear, and the spring means consisting of coil springs arranged around the pins and acting to draw the rings toward one another and into frictional contact with the disks.

References Cited by the Examiner

UNITED STATES PATENTS

| | | | |
|---|---|---|---|
| 1,952,728 | 3/34 | Rathbun | 254—168 |
| 2,195,334 | 3/40 | Lethern. | |
| 2,624,185 | 1/53 | Friedmann | 242—74 X |
| 2,773,975 | 12/56 | Farrington et al. | 254—168 X |
| 2,905,231 | 9/59 | Olson | 280—150 |
| 3,003,453 | 10/61 | Jamieson | 242—54 X |
| 3,022,089 | 2/62 | Botar | 280—150 |
| 3,027,116 | 3/62 | Holloway | 242—86.5 |
| 3,032,914 | 5/62 | Valle | 242—56.9 X |

MERVIN STEIN, *Primary Examiner.*

DONALD W. PARKER, *Examiner.*